Figure 1:
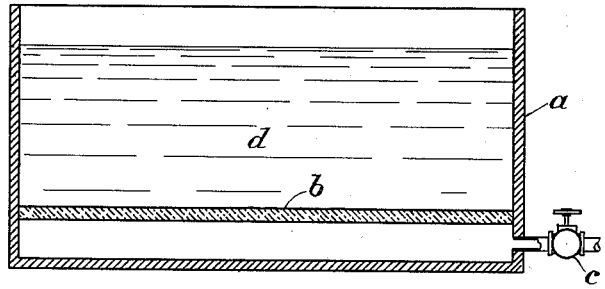

Feb. 1, 1927.  
H. E. WETHERBEE  
1,615,970  
METHOD OF AND MEANS FOR RECOVERING AND REGENERATING LEACHING SOLUTIONS  
Filed May 10, 1924  2 Sheets-Sheet 1

INVENTOR:  
Herbert E. Wetherbee,  
BY

ATTORNEY.

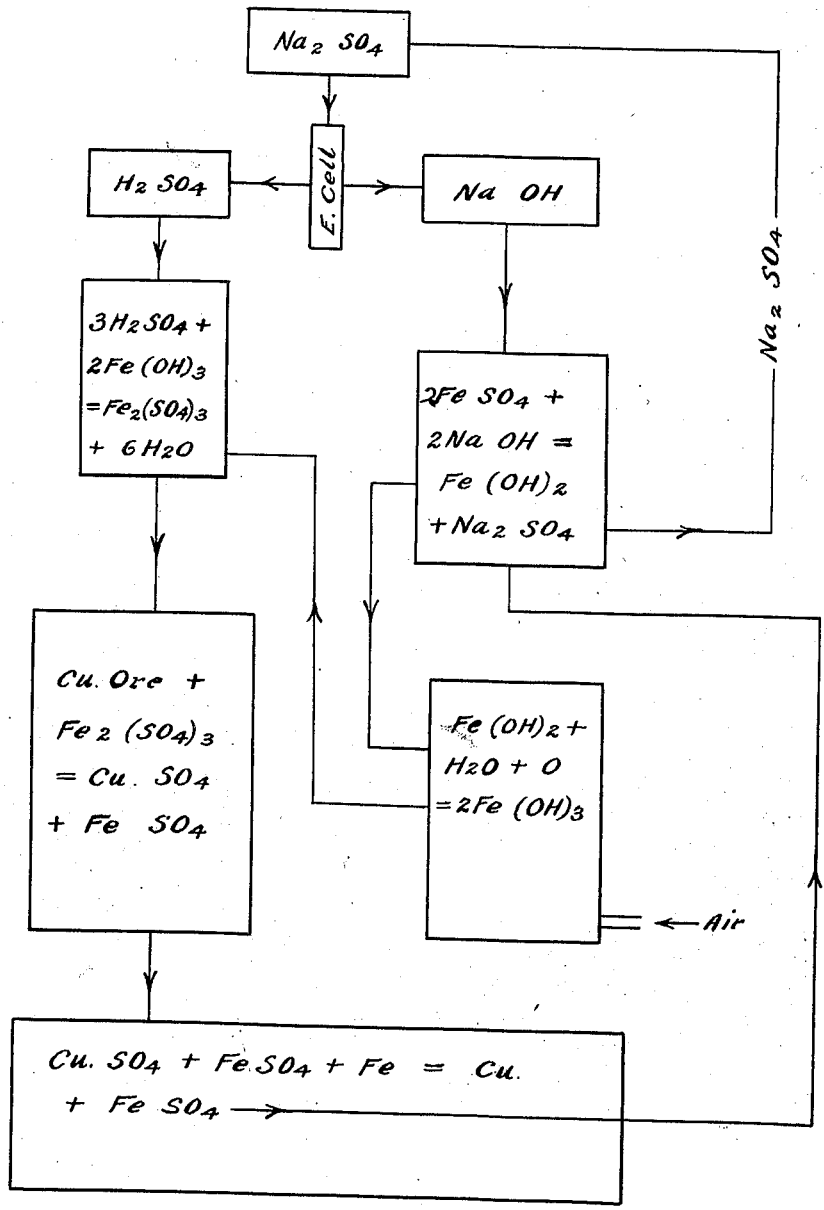

Patented Feb. 1, 1927.

1,615,970

UNITED STATES PATENT OFFICE.

HERBERT E. WETHERBEE, OF CLEVELAND HEIGHTS, OHIO, ASSIGNOR OF ONE-THIRD TO RICHARD F. GRANT AND ONE-THIRD TO HOWARD M. HANNA, BOTH OF CLEVELAND, OHIO.

METHOD OF AND MEANS FOR RECOVERING AND REGENERATING LEACHING SOLUTIONS.

Application filed May 10, 1924. Serial No. 712,420.

My invention relates to improvements in method of and means for recovering and regenerating leaching solutions, and has for its object the provision of ways and means for cheaply and efficiently extracting metals and metallic values from natural deposits as a continuous leaching process.

In the leaching of copper and other ores, dilute acid solutions of ferric sulphate are effective for the extraction of the oxides, carbonates, sulphides, and other compounds of the metal as well as the native metal itself. The solution also reacts effectively upon iron pyrites, as an example of different class of ores, accompanied by the formation of free acid.

The leaching action of ferric sulphate solutions, however, is retarded by the presence of basic sulphates of iron and is still more seriously retarded if a considerable portion of the iron is present in solution as ferrous sulphate. Nevertheless, in the formation or deposit of cement copper from the leached liquid by using iron scrap, ferrous sulphate necessarily is produced, thus:

$$CuSO_4 + Fe = Cu + FeSO_4.$$

From the foregoing it is seen that the ferric sulphate with which the operation started, must be reduced to ferrous sulphate, while the free acid likewise will form ferrous sulphate in its reaction upon the iron scrap.

Theoretically it requires only nine pounds of iron scrap to deposit ten pounds of cement copper from the leaching solution, but it has been found in practice that approximately twice the amount of iron must be used, due to the impurities in the scrap and the reactions resulting in the production of ferrous sulphate.

Since the ferrous sulphate solution may not be employed for further leaching purposes, either the addition of fresh acid or the removal of a portion of the combined iron, and oxidization of the sulphate, normally would be required in the art. However, the use of the usual oxidizing reagents is expensive, as is electrolytic oxidation of the solution. Oxidization theoretically may be effected by blowing air through the hot solution, but it is found that this step is extremely slow and inefficient, while there is a constant tendency to form basic sulphates if the acid content is not sufficient.

Accordingly, it has been my purpose to devise ways and means for recovering and regenerating the spent leaching solution of ferrous sulphate, involving the ready and inexpensive oxidization of the salt and the conversion and recovery of the reagent employed. Thus I have found that upon treating the ferrous sulphate solution with caustic soda, ferrous hydroxide is formed, which may very readily be oxidized by subjecting the precipitate to the action of the air. This may be accomplished either in the solution of sodium sulphate resulting from the reaction, or it may be converted in water, either at higher or normal temperatures, by blowing air through the liquid.

Economy of operation requires that the caustic soda shall then be reclaimed and this is readily accomplished in an electrolyzing diaphragm tank, as will be more fully explained in connection with the accompanying drawings, wherein:—

Figure 2:
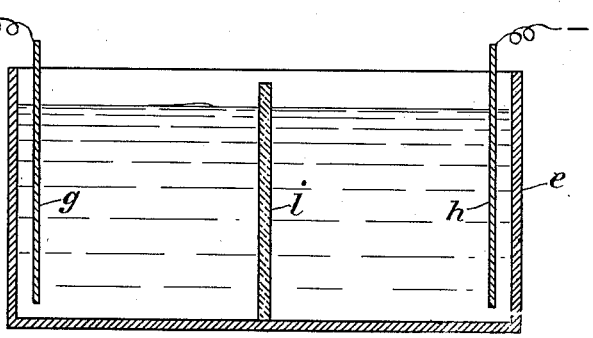
Figure 3:
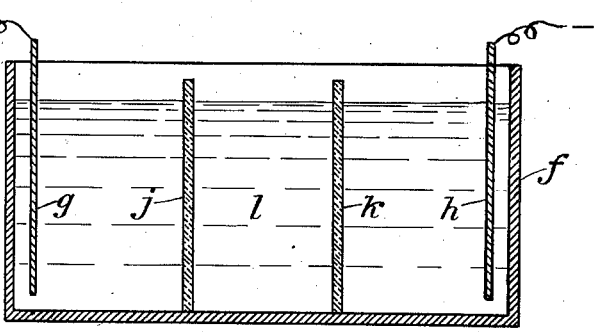
Figure 3:

Figure 1 is a diagrammatic view of a treating tank for subjecting the ferrous hydroxide to the action of air, Fig. 2 is another diagrammatic view of an electrolyzing tank for recovering the caustic soda and acid, Fig. 3 is still another diagrammatic view of an electrolyzing tank of modified construction; both of said tanks having diaphragms for retaining the regenerated reagents, and Fig. 4 is a flow sheet graphically indicating the preferred procedure as herein outlined.

Referring first to Fig. 1, the tank $a$ is shown with a bottom diaphragm $b$ of porous material such as alundum block, through which air under pressure from pipe $c$ readily permeates the body of the solution $d$ containing the ferrous hydroxide, which thereby is rapidly converted into ferric hydroxide in accordance with the following reaction:

$$2Fe(OH)_2 + H_2O + O = 2Fe(OH)_3.$$

The tanks $e$ and $f$ of Figures 2 and 3 are electrolyzing tanks for recovering the caustic soda and acid; each being provided with anode and cathode plates *g h*, preferably of lead and iron respectively, which are separated by interposed vertical porous diaphragms *i* or *j k*.

The decanted sodium sulphate solution being placed in either of said tanks and current being applied to the electrolytic plates, sodium hydrate will be regenerated at the left and sulphuric acid at the right of said tanks respectively. It will be observed that the tank of Fig. 3 provides an intermediate compartment *l* which will contain any unconverted sodium sulphate solution.

The cyclic process of leaching that is insured by my present improvement may now be briefly explained. A dilute leaching solution of ferric sulphate containing from two to four per cent is applied in quantity to the desired mineral deposit or to a native copper deposit; the latter reaction being as follows:

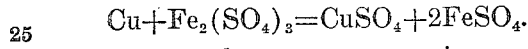

$$Cu + Fe_2(SO_4)_3 = CuSO_4 + 2FeSO_4.$$

Thereupon the cement copper is recovered by treating with iron scrap as previously indicated; the resulting ferrous sulphate solution is precipitated by adding caustic soda and the conversion is effected in the tank of Fig. 1, readily producing ferric hydroxide by subjecting the ferrous hydroxide to the action of air at any desired temperature.

Preferably the sodium sulphate solution is decanted and is electrolyzed in the tank of Fig. 2 or Fig. 3; the recovered sulphuric acid being used to convert the ferric hydroxide into ferric sulphate for continuing the leaching process. Similarly, the recovered sodium hydroxide may be used again to precipitate the ferrous hydroxide from the leaching solution, thereby completing the cycle of leaching and regenerating without appreciable loss of the reagents employed.

While I have explained my improvement in its preferred mode, it should not be understood that I limit myself to the particular reagents, inasmuch as any suitable ferric salt and precipitating hydroxide may be employed with analogous chemical reactions for producing the results herein set forth.

Having now described the preferred method and indicated the reagents and means for practicing my improvement, I claim as new and desire to secure by Letters Patent, the following:—

1. The herein described method for regenerating leaching solutions of ferrous salts, which consists in precipitating the ferrous hydroxide, oxidizing the hydroxide and producing the ferric leaching salt by dissolving said hydroxide, substantially as set forth.

2. The herein described method for regenerating leaching solutions of ferrous sulphate, which consists in precipitating the ferrous hydroxide, oxidizing the hydroxide by currents of air and adding sulphuric acid to produce ferric sulphate solution, substantially as set forth.

3. The herein described cyclic process for leaching minerals, which consists in subjecting the mineral body to the action of a dilute ferric leaching solution, recovering the metallic value thereof, precipitating ferrous hydroxide from the leaching solution, oxidizing the ferrous hydroxide and adding acid to regenerate the ferric leaching solution, substantially as set forth.

4. The herein described cyclic process for leaching minerals, which consists in subjecting the mineral body to the action of a dilute ferric leaching solution, recovering the metallic value thereof, precipitating ferrous hydroxide from the leaching solution, oxidizing the ferrous hydroxide, electrolyzing the solution to recover the hydrate and acid values thereof, and adding acid to generate the ferric leaching solution, substantially as set forth.

5. In apparatus for regenerating leaching solutions, the combination with a container, of a porous diaphragm therein and means for supplying air currents to the container through said diaphragm, substantially as set forth.

6. In apparatus for regenerating leaching solutions, the combination with a container, of a porous diaphragm therein, and means for supplying air in finely sub-divided form at the surface of said diaphragm to the contents of the container, substantially as set forth.

7. In apparatus for regenerating leaching solutions, the combination with a container, of a porous diaphragm forming the bottom of said container, and means for supplying air under pressure to the container contents through the porous diaphragm, substantially as set forth.

In testimony whereof I do now affix my signature.

HERBERT E. WETHERBEE.